United States Patent Office 3,500,591
Patented Mar. 17, 1970

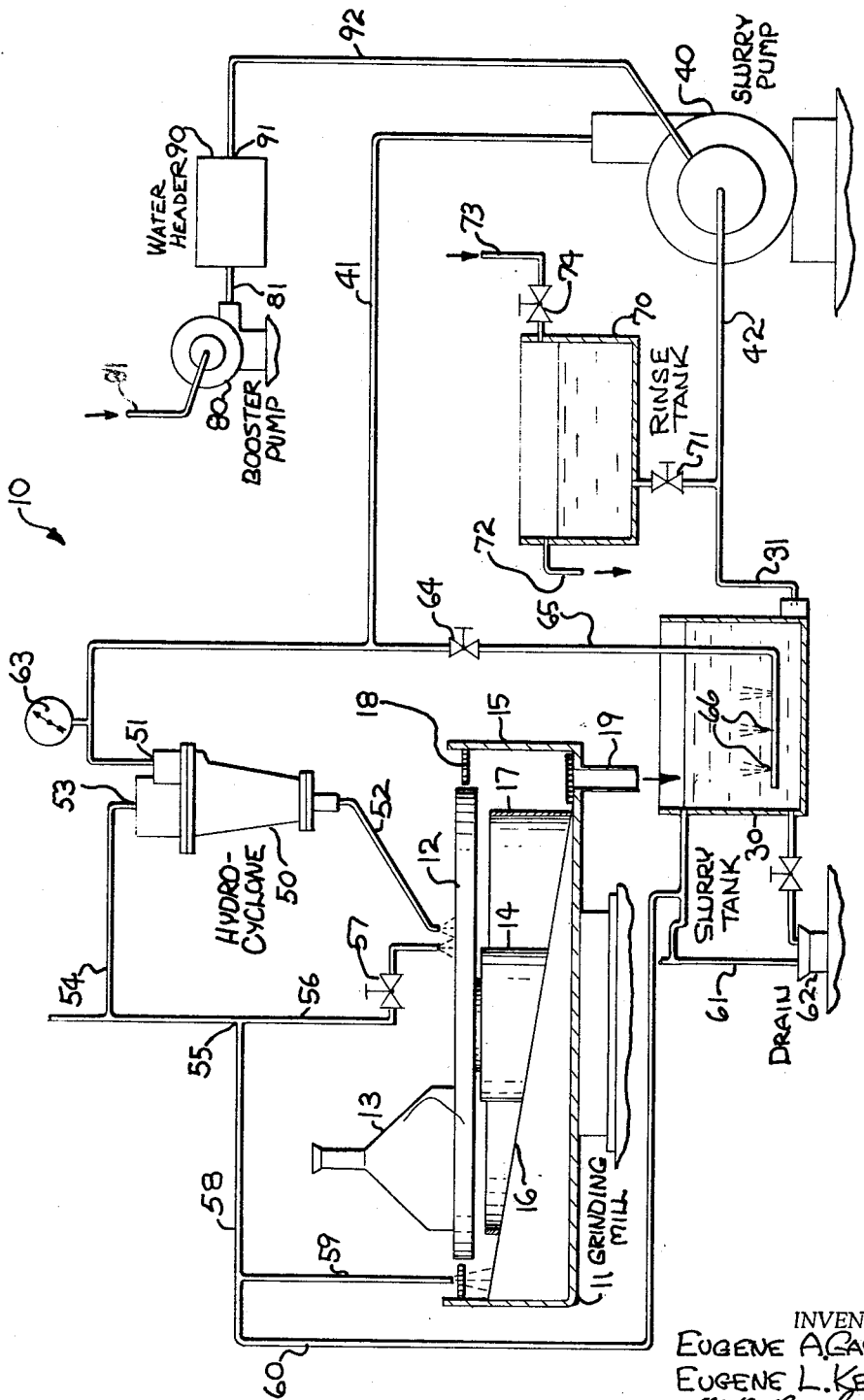

3,500,591
GLASS GRINDING METHOD AND APPARATUS
Eugene A. Gawronski and Eugene L. Keith, Columbus, Ohio, assignors to Owens-Illinois, Inc., a corporation of Illinois
Filed Nov. 21, 1966, Ser. No. 595,740
Int. Cl. B24b 57/00, 1/00
U.S. Cl. 51—263
14 Claims

ABSTRACT OF THE DISCLOSURE

An apparatus and method for grinding the surface of glass articles by employing a grinding mill that utilizes an aqueous abrasive laden slurry. An apparatus consisting essentially of a closed slurry system that recirculates an abrasive carrying liquid through a hydrocyclone and delivers an abrasive-rich slurry mixture to a grinding mill. A method of utilizing a minimum of inlet fluids to satisfy the demands of an entire recirculation system while minimizing the loss of grinding abrasive material. A method of accurately delivering a grinding material and water slurry at controlled feed rates and concentrations.

---

The present invention relates to the grinding of glass articles such as television tube components and the like. More particularly, the invention relates to the method and apparatus for producing a ground edge on the mating parts of glass objects such as cathode ray tubes.

It has been quite common for some time to manufacture cathode ray tubes in two or more parts. The complete assembly, commonly known as a bulb, is made by joining the various parts together either by welding or by employing solder glass connections. In order to join together, for example, the funnel portion of a television bulb with the flanged section of the viewing surface, or faceplate, the edges of the mating parts must be properly contoured or shaped. The proper edge preparation of the bulb parts is essential since the assembled bulb must possess symmetry with respect to an axis passing normal through the faceplate and extending back through the funnel and its attached neck portion.

To illustrate the present invention, reference will be made to the grinding of a television bulb funnel. It is, of course, within the scope of the present invention to apply the herein described method and apparatus to the grinding or polishing of other non-metallic, preferably glass, objects.

During the production of television bulb funnels, a gob of glass is inrtoduced into a mold and the funnel is shaped to its frusto-conical configuration by pressing, spinning or a combination of pressing and spinning. The resulting funnel contains an imperfect edge surface at its large end primarily because a moil portion is ringed off to remove the unwanted glass that has extended beyond the desired dimensions of the funnel during its manufacture. The edge surface at the large end of the funnel varies considerably with a planar surface, therefore, it is desirable that the irregularities and fractured pieces of glass be removed by grinding.

In grinding glass surfaces such as the aforementioned television bulb funnel edge, the funnel is chucked or mounted so that its longitudinal axis is perpendicular to the surface of a moving grinder. The grinder as employed in a grinding mill can be a continuously driven belt or a circular disc. For purposes of illustration, a grinding mill employing a circular disc will be referred to throughout the specification. To facilitate a rapid and accurate removal of the unwanted glass from the funnel, an aqueous solution containing an abrasive material dispersed therein is fed to the disc employed in the grinding mill.

The abrasive material employed along with the fluid medium for rough cuts or grinding can be uniformly graded particles of garnet, sand, pumice, etc. For finer cuts and polishing, if desired, a slurry comprised of a fluid medium containing very finely divided rare earth abrasives can be utilized. A fairly fast cutting or removal rate without an overall loss of efficiency can be attained by using rare earth oxides in a fluid medium between the glass surface or edge and the power driven grinding tool. For moderately fast cuts that result in a smooth glass surface, a lanthanum or cerium oxide mixture may be employed. A typical rare earth oxide mixture suitable for achieving a relatively fine cut on glass surfaces is marketed as "Barnesite 85" by the American Potash & Chemical Corporation of West Chicago, Ill.

Heretofore it has been pointed out that the abrasive materials utilized in the grinding of glass surfaces is employed in conjunction with a suitable fluid medium. For purposes of illustration, the fluid medium hereinafter referred to will be water, however, it is not intended that the invention be limited to an aqueous solution per se. The water slurry may contain up to 75 percent by volume of grinding material and is continuously circulated to present a fresh supply of grinding slurry to the glass surface being ground. In addition to the efficient removal of glass particles from the glass articles, the circulating water slurry is beneficial in removing heat generated by the work done during the grinding operation. By using a relatively closed recirculation system, the make-up losses normally associated with the water and, more important, the abrasive compound can be held to a minimum. While the loss of water from a grinding operation is not normally an expensive item, the loss or dumping of large quantities of contaminated or silted water by industry is meeting with increasing resistance from those who are struggling to clear up the natural water resources of our country. Therefore, a closed circuit slurry feed system that emits a minimal water discharge is highly desirable when considered from a pollution standpoint.

Accordingly, it is an important object of the present invention to provide an improved method for removing unwanted material from an article by controlling and metering the abrasive grinding material and the fluid medium utilized in its conveyance.

Another important object of the present invention is to provide a method of delivering a concentrated grinding slurry to the surface of a glass article which is to be ground and the removal of the slurry from the vicinity of the glass article subsequent to the grinding operation.

A further object of the present invention is to provide a method of removing the abrasive containing slurry from a grinding mill and a rinse tank, then conditioning the slurry so that it may be delivered once again to the article being ground.

An additional object of the present invention is to provide an apparatus for the grinding or polishing of an article wherein the slurry employed during the grinding operation is collected and pumped through a conditioning unit, delivered to a grinding mill and once again collected for recirculation through the apparatus.

An additional important object of the present invention is to provide in a grinding apparatus a novel arrangement for feeding the abrasive slurry to a grinding mill which insures an even mixture of the abrasive and a selective proportioning of the abrasive and water delivered to the object which is to be ground.

Another object of the present invention is to achieve increased stock removal from the article that is being ground.

The specific nature of this invention, as well as other objects and advantages thereof, will become apparent to those skilled in the art from the following detailed description taken in conjunction with the annexed sheet of drawings on which is illustrated, by way of illustrative example only, the preferred embodiments of the present invention.

On the drawing:

The drawing represents a schematic shown partly in section for clarity. Referring now to the drawing, there is shown a grinding apparatus 10 comprising a grinding mill 11 and its associated parts which will be commented upon in more detail elsewhere. The grinding mill 11 is positioned so that the spent grinding slurry can be collected and routed to an adjacently positioned slurry tank 30. A slurry pump 40 is employed to convey the slurry from the slurry tank 30 to a hydrocyclone 50. The abrasive laden slurry is proportionately segregated by the well-known centrifugal action of a hydrocyclone. That portion of the effluent from the central section of the hydrocyclone 50 is relatively free from the grinding abrasive and is utilized in an advantageous manner that will be hereinafter explained. The effluent from the outer lower section of the hydrocyclone is heavily laden with the grinding abrasive and it is delivered to the top surface of grinding disc 12 of grinding mill 11.

A television bulb funnel 13 is schematically shown with the edge of its large end resting against the top surface of grinding disc 12 of grinding mill 11. After funnel 13 has been suitably ground, the grinding abrasive that is adhered thereto is removed by rinsing funnel 13 in rinse tank 70. The fluid line leading from rinse tank 70 is connected into the fluid line between slurry tank 30 and slurry pump 40; in this manner the rinse water collected in rinse tank 70 can be delivered either to slurry tank 30 or to slurry pump 40 as the occasion may demand.

Returning now to grinding mill 11, grinding disc 12 is centrally supported from a rotational power source which is represented in block form by numeral 14. A typical power source can be an electrical motor, however, other power sources such as air motors could be equally well employed. Surrounding grinding disc 12 and its combination support and power source 14, is tank structure 15. Tank structure 15 is preferably located concentrically with respect to grinding disc 12 and extends higher than the top surface of grinding disc 12. Tank 15 contains a sloping bottom 16 angularly disposed with respect to the top planar surface of annular grinding disc 12. Positioned beneath grinding disc 12 and preferably in concentric alignment therewith is a cylindrical baffle 17 attached in a sealed manner to the top of inclined bottom 16. Thus it can be ascertained there is a relatively narrow inclined path lying between the inside of tank 15 and the outside of baffle 17 over which the grinding slurry will flow downwardly thereover under the influence of gravity.

As television bulb funnel 13 is being ground to the desired dimension, the grinding slurry and the small pieces of glass that are removed from the funnel flow radially outward along the top of grinding disc 12 until they are free to drop upon the inclined surface of bottom 16. The larger pieces or particles of glass are prevented from entering the slurry collection system of grinding mill 11 by screen 18. Screen 18 is positioned in concentric fashion between the peripheral edge of grinding disc 12 and the inside vertical wall of tank 15. As the spent grinding slurry passes downwardly through screen 18, it flows to the lowest side of sloping bottom 16 where it exits from grinding mill 11 through outflow pipe 19. The slurry carried by pipe 19 from grinding mill 11 is then deposited into slurry tank 30.

The slurry is collected in slurry tank 30 and is drawn therefrom through line 31 and hence to slurry pump 40. Slurry pump 40 then forces the slurry out through line 41 to inlet 51 of hydrocyclone 50. Under the rotary action of hydrocyclone 50, the heavier particles contained within the slurry are forced out through line 52 after they are thrown to the hydrocyclone periphery and dropped to the lowermost portion thereof. Line 52 then carries the highly enriched grinding slurry to the top of grinding disc 12 so that it can once again be utilized in the grinding of television funnels such as 13. The very small particles and clear water are drawn upward through centrally located exit 53 of hydrocyclone 50. The lightly loaded slurry water exiting from 53 is carried by line 54 to T 55. From T 55 the water can travel through line 56 and be deposited on the top surface of grinding disc along with the previously mentioned enriched slurry that is carried by line 52. By the proper setting of valve 57, the proper consistency of the grinding slurry can be maintained.

The demand of so-called clear water through valve 57 will not accommodate all of the water passing outward through exit 53 of hydrocyclone 50. The overflow of water from line 54 is carried by lines 58, 59 and deposited at the high end of sloping bottom 16 of grinding mill 11. In this manner, the accumulation of spent grinding slurry is washed down the annular inclined path around both sides of grinding mill 11.

Should lines 58, 59 not be capable of carrying the discharge of water from T 55, an additional line 60 is employed to carry the clear water and its relatively light load of abrasive material to slurry tank 30. Line 60 may be used along with line 59 if desirable however. If the level of the liquid in slurry tank 30 is too high to accept the overflow from line 60, it will exit through line 61 and be carried away through sewer drain 62.

The pressure of the fluid that enters hydrocyclone 50 from slurry pump 40 can be monitored by pressure gauge 63. If the volume of slurry carried away from the slurry pump 40 by line 41 varies, the amount of fluid delivered to inlet 51 of hydrocyclone 50 can be regulated by valve 64. Valve 64 is normally partially open so that some of the slurry that is delivered by line 65 will be carried into slurry tank 30 and be ejected out through orifices 66 thus agitating the slurry mixture in slurry tank 30.

As previously mentioned, the completely ground television funnels 13 are cleaned in rinse tank 70. Rinse tank 70 is located at an equal or preferably higher elevation than slurry tank 30 so that during the initial start-up period, water from rinse tank 70 can be fed through valve 71 and line 31 to slurry tank 30. Also during normal operations, any accumulation of grinding abrasive can be flushed from rinse tank 70, through valve 71, and thus into the lead-in line 42 that feeds slurry pump 40. Should the level of liquid in rinse tank 70 rise too high, an overflow 72 is provided for removal of the excess liquid. The excess liquid can be returned to slurry tank 30 or it can be directed to sewer drain 62. In order to initially fill rinse tank 70, a water inlet and shut-off valve 74 is provided.

Also shown in the drawing is a water inlet 81 that feeds booster pump 80. Booster pump 80 supplies pressure via line 81 to water header 90. Water header 90 can be utilized to supply water to a plurality of grinding mill systems if desired. Only one exit 91 has been shown in the drawing, however. The water from header 90 is carried away from exit 91 by line 92. Line 92 supplies water to the seal cage of slurry pump 40. The continued inflow of water from line 92 lubricates the bearings of slurry pump 40 and at the same time provides enough make-up water in the relatively closed system of the entire grinding operation to avoid the necessity of adding additional liquid from other sources.

The continued flow of water in through the bearing seal of slurry pump 40 will be nearly matched by a continual outflow through line 61 during normal grinding operations. A small amount of liquid will be lost because of evaporation and other small losses associated with the grinding mill 11. This deficiency of liquid will be noted in the level of the slurry within the slurry tank 30, whereupon the required liquid can be drawn into the system through valve 71 which permits the rinse water from rinse tank 70 to enter line 42 which leads to slurry pump 40.

Under normal operating procedures, the water entering the system will be removed from the system as pointed out supra. The removal of some water from the system permits the fine glass particles and spent grinding compound to be purged, thus increasing the overall time span over which the system can be operated without a shutdown for cleaning.

While certain representative embodiments and details have been shown for the purpose of illustrating the invention, it will be apparent to those skilled in this art that various changes and modifications may be made therein without departing from the spirit or scope of the invention.

What is claimed is:

1. The method of feeding an abrasive material to an article and article grinding tool including the steps of:
    (1) delivery a concentrated abrasive containing fluid to the abrading surface of said tool,
    (2) delivery a less concentrated abrasive containing fluid to the abrading surface of said tool simultaneously with said concentrated fluid, and
    (3) regulating the quantity of at least one of said fluids to form a grinding slurry of the desired consistency so optimum removal of material from said article will be achieved.

2. A method as claimed in claim 1 including the step of removing the used grinding slurry from said tool with a portion of the less concentrated abrasive containing fluid so that the slurry can be collected for recirculation.

3. The method of feeding an abrasive material to an article grinding tool including the steps of:
    (1) circulating a fluid and abrasive particle slurry through a closed pipe system by means of a pump,
    (2) conveying said slurry material to a hydrocyclone where it is fractioned into a first slurry portion of high particle density and a second slurry portion of low particle density,
    (3) directing said first slurry portion against the work surface of said tool, and
    (4) directing part of said second slurry portion against said tool to mix with the first slurry portion thereby facilitating its removal from the work surface.

4. A method as claimed in claim 3 including the step of removing a measured amount of said slurry material from said pipe system so that it acts as an agitation means within a slurry tank.

5. In a closed circuit system used with a grinding tool, the method of maintaining in balanced relationship the quantity of fluid that flows into the system and the quantity of fluid that flows out of the system including the steps of:
    (1) drawing an abrasive laden slurry from a slurry tank and circulating it through a closed pipe system by means of a slurry pump,
    (2) introducing additional fluid into the closed pipe system through the bearing seal region of said pump,
    (3) conveying said slurry material, along with the newly added fluid, to a hydrocyclone where it is divided into a first slurry portion of high particle density and a second slurry portion of low particle density,
    (4) directing said first slurry portion against the work surface of said tool so that it may be used in grinding an article,
    (5) directing part of said second slurry portion against said tool to mix with the first slurry portion thereby facilitating its removal from the work surface,
    (6) returning the other part of said second slurry portion to said slurry tank, and
    (7) permitting an overflow from said slurry tank in an amount substantially equal to the amount of fluid added through the pump bearing seal region.

6. A method as claimed in claim 5 wherein the overflow from said slurry tank has substantially the same particle concentration as the said second slurry portion that is returned to said tank.

7. A method as claimed in claim 5 wherein a measured amount of said second slurry portion is directed against the work surface of said tool.

8. A method as claimed in claim 5 wherein the measured amount of said second slurry portion is directed against the work surface simultaneously along with said first slurry portion so that an optimum grinding action can be maintained by said tool.

9. A method as claimed in claim 5 wherein a measured amount of the slurry that has passed through the pump is directed into the bottom portion of said slurry tank so that uniform agitation is maintained therein.

10. A method as claimed in claim 5 wherein the slurry collected in a rinse tank can be periodically admitted to the closed circuit system.

11. An apparatus for feeding an abrasive slurry from a slurry containing means to an article grinding means comprising a closed pipe system, means to continuously circulate said slurry in said closed pipe system, means to separate said slurry into a high particle density slurry and a low particle density slurry, means to deliver said high density slurry to the work surface of said article grinding means, and means to employ said low density slurry in mixing with the high density slurry on said work surface whereby the resulting grinding slurry is easily removed from the work surface of the grinding means.

12. An apparatus for feeding an abrasive slurry from a slurry containing means to an article grinding means comprising a closed pipe system, means to continuously circulate the slurry in a closed pipe system, means to separate the slurry into a high particle density slurry and a low particle density slurry, means to deliver the high density slurry to the work surface of the article grinding means, means to employ the low density slurry in mixing with the high density slurry, and means to simultaneously deliver a metered quantity of the low density slurry to the work surface, whereby the resulting grinding slurry is easily removed from the work surface of the grinding means.

13. In combination, an article grinding apparatus comprising a slurry pump for removing a supply of abrasive laden slurry from a slurry tank, a fluid supply system to introduce fluid into said pump through a bearing seal thereof, said fluid becoming part of the discharge from said pump, means to divert a portion of the discharge from said pump so that it may be directed to said slurry tank to provide agitation of the contents prior to the delivery thereof to said pump, a hydrocyclone positioned so as to receive at least a portion of a pressurized discharge from said pump, a grinding tool adapted to receive on a movable work surface thereof a more dense slurry discharge from said hydrocyclone, means to divert a portion of a less dense slurry discharged from the hydrocyclone so that it may be delivered to the movable work surface of the grinding tool simultaneously with the less dense slurry, means associated with said grinding tool to catch the slurry after it has been used in grinding an object, said means adapted to receive the less dense slurry discharge from said hydrocyclone so that the used slurry can be removed from said grinding tool and deposited in said slurry tank.

14. In combination, an article grinding apparatus comprising a slurry pump for removing a supply of abrasive laden slurry from a slurry tank, said slurry pump including a pump bearing to receive make-up liquid; a hydrocyclone positioned so as to receive at least a portion of a pressurized discharge from said pump; a grinding tool adapted to receive on a movable work surface thereof a more dense slurry discharge from said hydrocyclone; means associated with said grinding tool to catch the slurry after it has been used in grinding an object, said means adapted to receive a less dense slurry discharge from said hydrocyclone so that the used slurry can be removed from said grinding tool and deposited in said slurry tank; means to introduce make-up liquid into said pump bearing; means to divert a portion of the less dense slurry so that it may be discarded, the volume of the diverted slurry being substantially equal to the volume of make-up liquid introduced through the pump bearing; and means to divert a portion of the discharge from the pump so that it may be directed to the bottom portion of the slurry tank to provide agitation of the contents prior to the delivery thereto to the pump.

References Cited

UNITED STATES PATENTS

| | | | |
|---|---|---|---|
| 1,089,894 | 3/1914 | Bechtel | 51—264 |
| 1,207,896 | 12/1916 | Golightly | 51—264 |
| 1,343,710 | 6/1920 | Cruikshank | 51—264 |
| 2,994,314 | 8/1961 | Wayland et al. | 51—263 X |
| 3,247,626 | 4/1966 | Kunkle et al. | 51—283 |

OTHELL M. SIMPSON, Primary Examiner

D. G. KELLY, Assistant Examiner

U.S. Cl. X.R.

51—283, 292